US007275659B2

(12) United States Patent
Openiano

(10) Patent No.: US 7,275,659 B2
(45) Date of Patent: Oct. 2, 2007

(54) DRILL AND DRIVER BIT DISPENSING SYSTEM

(76) Inventor: Renato Openiano, 934 Fuchsia La., San Diego, CA (US) 92154

( * ) Notice: Subject to any disclaimer, the term of this patent is extended or adjusted under 35 U.S.C. 154(b) by 529 days.

(21) Appl. No.: 10/211,512

(22) Filed: Aug. 2, 2002

(65) Prior Publication Data

US 2004/0222115 A1 Nov. 11, 2004

Related U.S. Application Data

(60) Provisional application No. 60/371,854, filed on Apr. 11, 2002.

(51) Int. Cl.
*B65G 59/00* (2006.01)

(52) U.S. Cl. ....................................... 221/268; 206/379

(58) Field of Classification Search .................... 221/1, 221/199, 210, 268; 206/379, 372, 373; 433/77
See application file for complete search history.

(56) References Cited

U.S. PATENT DOCUMENTS 3,270,416 A * 9/1966 Massa ......................... 433/77
3,451,133 A * 6/1969 Hathaway et al. ............ 433/77

* cited by examiner

*Primary Examiner*—Kenneth Noland
(74) *Attorney, Agent, or Firm*—Fuess & Davidenas

(57) ABSTRACT

A selected drill or driver bit ["d—d bit"] (i) is at a first time selected from a magazine and mounted to a rotary tool, normally an electric drill, and (ii) is at a later time removed from the tool and returned to the same magazine, each in a one-handed operation totally without manual contact with any of the drill or driver bit, a holder of the d—d bit, or any chuck of the tool. Coaction is realized between (i) a d—d bit holder having a sliding sleeve releasibly holding a d—d bit, and (ii) a d—d bit dispenser having multiple bores of complex interior contour each relieved to one side in a complex contour defining a side entrance and extraction channel. The d—d bit holder (and its mounted d—d bit) is (i) entered downward into a bore of the d—d bit dispenser, and (ii) plunged full to the bottom, whereupon (iii) the d—d bit is released while (iv) the d—d bit holder is withdrawn upward through the channel. Nearly the same process is repeated to mount a selected d—d bit; (i) the d—d bit holder is entered downward into the bore of the d—d bit dispenser, and (ii) plunged full downwards to contact a d—d bit, but is then (iii) extracted laterally sideways through the side entrance and extraction channel. Both mounting and dismounting of drill and driver bits is thus performed with easy and powerful movements transpiring over but a few seconds, with all drills and driver bits always being positively retained, each always within its associated bore of the d—d bit dispenser when not in use.

9 Claims, 8 Drawing Sheets

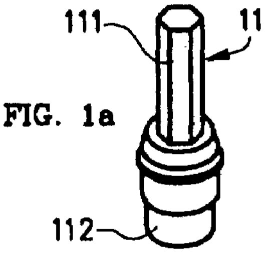
FIG. 1a
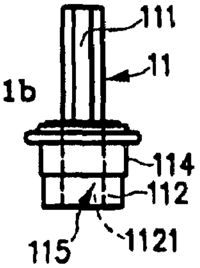
FIG. 1b
FIG. 3
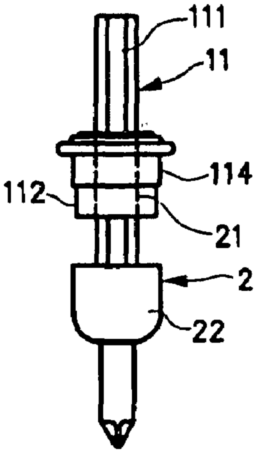
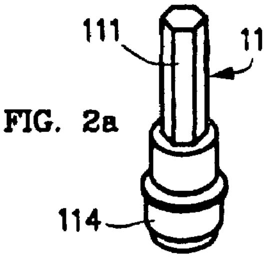
FIG. 2a
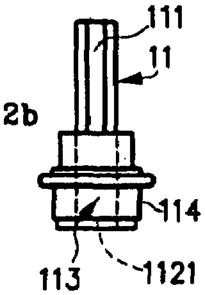
FIG. 2b
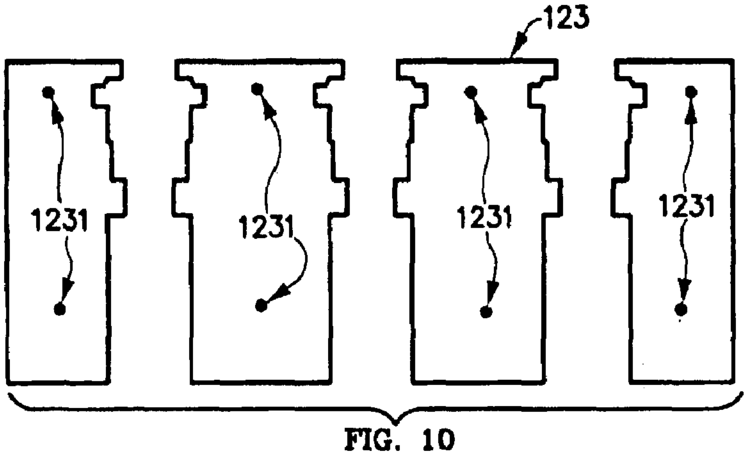
FIG. 10
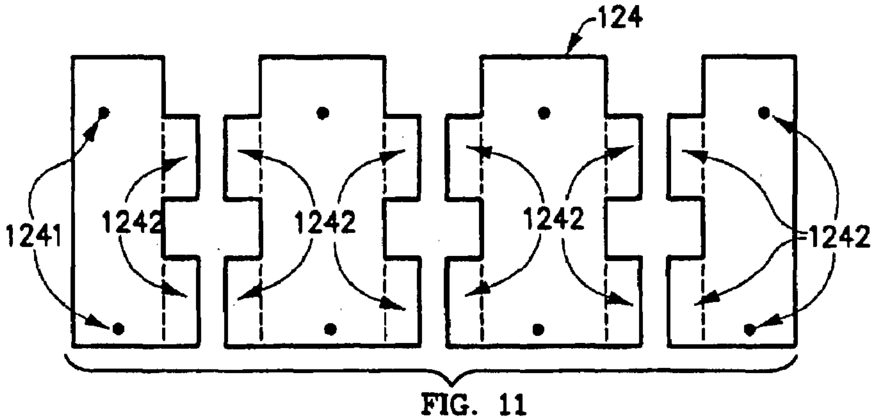
FIG. 11

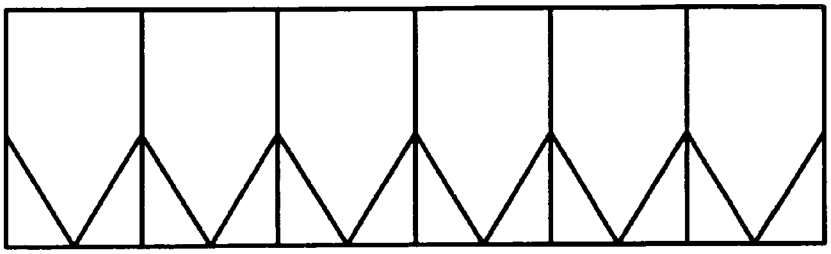
FIG. 12g
FIG. 12f
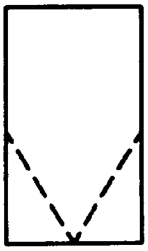
FIG. 12e
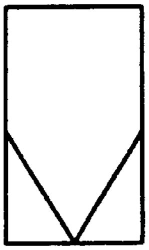
FIG. 12d
FIG. 12a
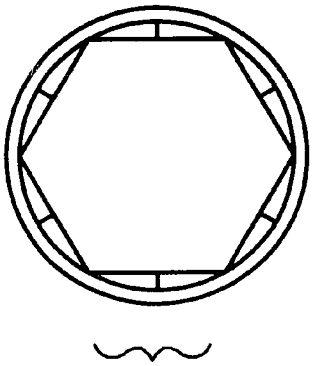
FIG. 12b
FIG. 12c
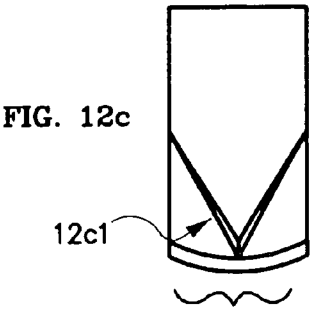
FIG. 12b FIG. 13b
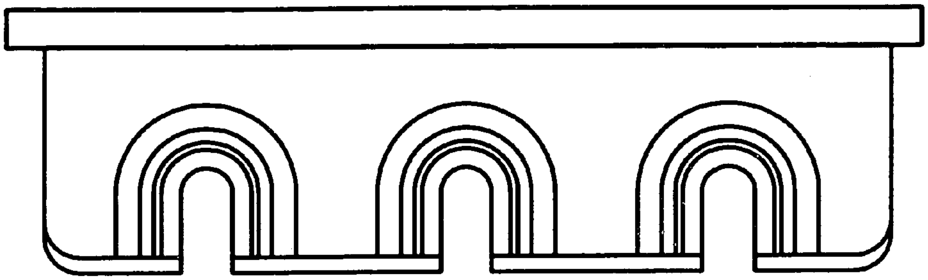
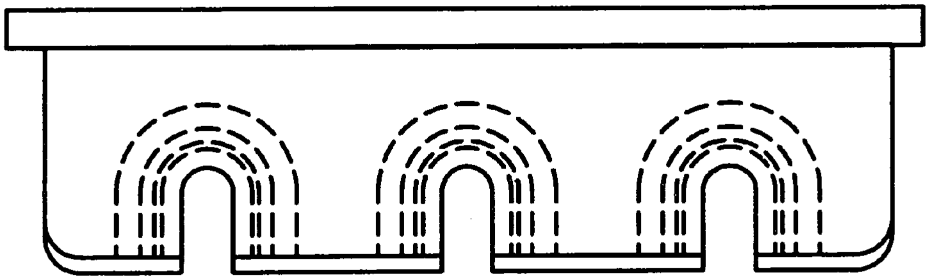
FIG. 13c
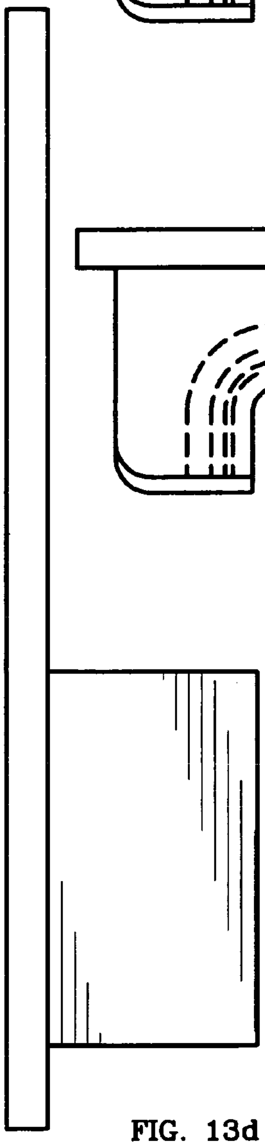
FIG. 13d
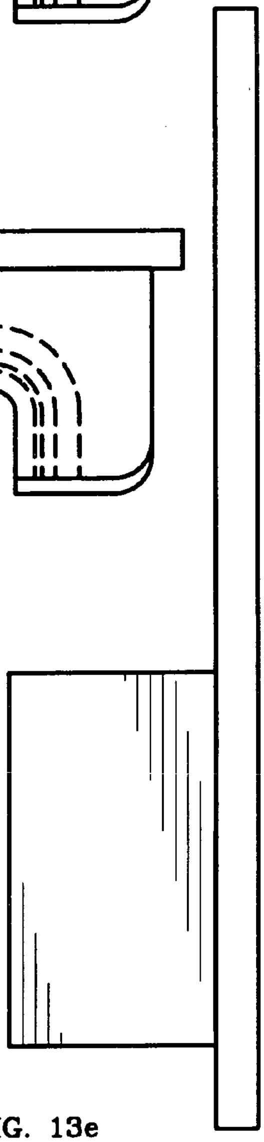
FIG. 13e

DRILL AND DRIVER BIT DISPENSING SYSTEM

RELATION TO A PROVISIONAL PATENT APPLICATION

The present patent application is descended from, and claims benefit of priority of, U.S. provisional patent application Ser. No. 60/371,854 filed on Apr. 11, 2002 for an EASY "ON-OFF" CORDLESS DRILL Bit DISPENSING SYSTEM to the selfsame inventor as the present utility patent application.

BACKGROUND OF THE INVENTION

1. Field of the Invention

The present invention generally concerns holders and dispensers of bits for rotary tools, including drill bits and drive bits for portable handheld electric drills.

The present invention particularly concerns systems for holding each of a number of interchangeable bits and/or drills for handheld electric drills when not in use, and also for holding a selected bit or drill in use within the handheld electric drill, especially when there is some form or cooperative interaction between the holding of the bits and/or drills not in use and the holding of the bit or drill in use so that a particular bit presently held the electric drill may be de-selected while a new bit or drill may be newly selected and become held to the electric drill.

2. Description of the Prior Art

Holders serving to adapt drills, and driver bits such as serve to drive screws and nuts, to the chucks of electric drills are quite common. Some have sliding and/or twisting elements which permit quick mounting of a selected drill, or driver, bit to the holder, and thus to the chuck of the drill.

Likewise, the exist various retainers and containers, often as are portable and sometimes as may be mounted to the belt and/or tool belt of a workman, for holding drills and/or drive bits while not in use. These retainers and containers will sometimes service to hold, normally in a vertically erect position, a drill or a driver bit while it is preliminarily entered directly into the bore of the chuck of an electric drill, of into a holder that is itself mounted to the chuck of an electric drill (and thus indirectly into the bore of the chuck). Conversely, a drill or a driver bit that is mounted in the chuck of an electric drill, or in a holder that is itself mounted in the chuck of an electric drill, can be, while still so mounted, entered into some retainers and holders of drills and driver bits.

However, both for holders and retainers/containers, the extent of any interaction or coaction has been limited to (i) preserving alignments, (ii) feeding a drill or driver bit to be mounted (in the case of loading the chuck of the drill), or (iii) receiving a drill or driver bit to be dismounted (in the case of unloading the chuck of the drill). The actual, final, step of tightening the mount of a new drill or driver bit, or loosing the mounting of an old drill or driver bit, is realized (i) by use of the hand (including with "keyless" chucks), (ii) by use of a tool, such as a chuck key, held by the hand. Thus one hand normally holds the electric drill while the other hand tends to at least a final unsecuring of an old drill or driver bit, or the securing of a drill or driver bit, to the chuck of the electric drill (or, equivalently, to a holder mounted in the drill's chuck).

The present invention will be seem to function differently, and to permit of an interaction and a coaction between, on the one hand, (i) a holder, mounted to the chuck of an electric drill, of a drill or a drive bit, and, on the other hand, (ii) a retainer or container in which typically many drills and/or drive bits not currently in use for drilling or driving (as the case may be) are stored. The interaction and a coaction will be seen to realize, among other advantages, that a drill or driver bit may be both mounted to, and de-mounted from an electric drill totally by the use of but one hand, which hand remains grasping the handle of the electric drill.

SUMMARY OF THE INVENTION

The present invention contemplates a system (i) where each of a number of interchangeable drills and/or driver bits ["d—d bits"] suitable for use in a handheld rotary tool—preferably a power tool and more preferably an electric drill—are conveniently held, normally in a waist-level belt-held reservoir, when not in use. Meanwhile, (ii) a selected one drill or driver bit ["d—d bit"] is held within the handheld rotary tool. Finally, (iii) an interchange of a d—d bit between the reservoir and the rotary tool—a de-selected d—d bit previously mounted to the rotary tool entering the reservoir while a newly-selected d—d bit becomes mounted to the rotary tool—is not only realizable totally without touching any of the d—d bit, or the reservoir, or the chuck of the rotary tool, but is, indeed, realizable with the use of but one single hand which hand remains upon the handle of the rotary tool. The system of the present invention is thus a "one-handed" automatic drill and/or driver bit ["d—d bit"] loading and unloading system.

More precisely, the drill and driver bit ["d—d bit"] dispensing system for a rotary power drill in accordance with the present invention permits a d—d bit to be at a first time selected and mounted to, and an a later time removed from, a rotary tool—more precisely to and from a d—d bit holder that is secured within a chuck of the rotary power drill—totally without manual contact with any of the d—d bit the holder of the d—d bit, or the chuck of the rotary power drill. Indeed, a selected d—d bit can be (i) picked up, (ii) used with the drill for drilling or screwing or the like, and (iii) subsequently discharged (for re-use in a repeated procedure at a later time) entirely by a driller using but one hand, which hand constantly remains grasping the handle of the rotary power drill.

The obvious advantage of the present invention is not primarily for one-handed drillers, but in permitting that a d—d bit may be easily and quickly interchanged within a rotary power drill by mere one-handed manipulation of the rotary power drill, thereby freeing the driller's remaining hand for actions such as holding a work piece.

A drill or driver bit ["d—d bit"] dispensing system in accordance with the present invention is normally used with (i) a rotary power drill having a chuck. The system preferably includes (1) various numbers of drill and driver bits ["d—d bits"] specially configured in their proximal (i.e., non-workpiece-engaging) end regions, (2) (typically) one (only) holder of the d—d bits tightened within the chuck of the drill, and (3) a (typically single) d—d bit dispenser where those d—d bits not presently in use in and by the rotary power drill are stored, and where an interchange from one d—d bit to another takes place.

Operation of the system is straightforward. The substantially rectilinear d—d bit dispenser—normally made of hard nylon or the like and suitable to mount to a workman's belt—has a number of elongate substantially vertical cavities that are completely relieved, top to bottom, in regions from a central bore to a same exterior side of the holder. The relieved volume between each cavity's bore and the accessible side-surface exterior of the d—d bit dispenser presents a complex pattern of wider and narrower regions that are intended to serve as and define a "side entrance and extraction channel".

Consider for a moment that a drill, or driver, bit (it matters not which) is already mounted in and at a distal end of the holder of d—d bits. The proximal end of the same d—d bit holder is secured within the chuck of the rotary power drill. (In other words, the d—d bit holder is conventionally mounted but once to the chuck of a rotary power drill, and thereafter used, in conjunction with the d—d bit dispenser component, in realizing the "quick release, quick mounting" of the present invention.) (Suspend, for a moment, inquiry as to how the d—d bit got mounted upon the d—d bit holder, which will momentarily become clear.) At the completion of a drilling or driving task, and being desirous of changing to a new d—d bit that is within a selected cavity of the d—d bit dispenser, a user of the rotary power drill first enters the d—d bit holder (and its connected d—d bit) downwards into an empty bore of the d—d bit holder.

One the d—d bit holder, and its affixed d—d bit, have been plunged to the bottom of the (previously empty) cavity of the d—d bit dispenser by pushing the rotary power drill downwards, the d—d bit is released. Mainly, coaction of both the d—d bit holder and the d—d bit with internal contours of the bore of the d—d bit dispenser causes each of (i) release of the d—d bit from the d—d bit holder, and (ii) a positive retention of the released d—d bit at the bottom of the bore of the d—d bit dispenser. When the d—d holder is lifted upwards in the cavity it leaves the d—d bit at the bottom of the cavity, while the d—d bit holder (which is attached to the rotary power drill) is enabled to receive (at a subsequent time, to be explained) another d—d bit.

The rotary power drill with its distal end d—d bit holder—which d—d bit holder is now empty and devoid of any d—d bit—is next again entered downwards into a cavity of the d—d bit dispenser—only this time into a cavity where exists a d—d bit next desired to be mounted. This d—d bit is at this time located and retained at the bottom of the selected cavity. It does not interfere with the downward entrance of the d—d bit holder into the cavity. The drill and its d—d bit holder are now poised to pick up and mount the selected d—d bit. To do so, the rotary power drill and its d—d bit holder are plunged downwards, causing the d—d bit holder to "pick up" and to engage the d—d bit that is contained within, and at the bottom of, the cavity. The rotary power drill and its d—d bit holder are then slid sideways out of the d—d bit dispenser through the side entrance and extraction Thus the d—d bit holder, which (i) entered the cavity empty downwards from the top of the cavity without a d—d bit attached now (ii) exits the same cavity through the side entrance and extraction channel with a selected d—d bit attached.

D-d bits are thus switched in their mounting to the d—d bit holder and, ultimately, the rotary power drill, totally by gross, and easily realized (i) up-down motions, and (ii) sideways, motions. The entire process takes much longer to describe than to do. By performance of this loading and unloading process, d—d bits will normally always remain in the same receptacle (save during periods of use in the rotary power drill) for life. Users thus become familiar with "where to go" to "discharge" and to "pick up" a particular d—d bit, and readily become capable of performing all desired manipulations at waist level, and without looking. Even a person who is unfamiliar with the system and poorly coordinated can after some moments of familiarization easily come to change a d—d bit within five seconds. Nothing can be "dropped" or spilled or jammed or broken by misapplication of mechanical forces and force vectors to the system. A d—d bit is either discharged to a proper (empty) dispenser location or it is not, thus either remaining (i) mounted to the chuck of the rotary power drill or (ii) within its designated cavity. To repeat, a d—d bit is either totally successfully mounted to the heretofore empty d—d bit holder semi-permanently affixed to the rotary power drill or else it is not, in which case it remains retained within a cavity of the dispenser.

Every mechanical action is positive: there is no shaking nor twisting nor slanting nor any motion ever required that may be perceived of as trying to get something or some part of the process to "take", or to "happen". The simple motions being simply performed, a d—d bit delivered into service at the distal end of the rotary drill is fully as securely, strongly, straightly, tightly and accurately mounted as if it was to be conventionally so mounted with all due skill and attention.

It will be understood by a practitioner of the mechanical arts that the preferred manner in which the system of the present invention is preferably divided into parts of the (i) d—d bit holder, and the (ii) d—d bit dispenser, is neither rigorous nor inviolate. For example, the drill bit holder is commonly semi-permanently affixed to the chuck a rotary power drill, but a rotary power drill of special construction need not have a chuck at all, but can have as its sole and only operative distal-end rotary drive region the actual distal end region of what was described above as a chuck-mounted d—d bit holder. Effectively the d—d bit holder is thus "integrated" into the rotary power drill.

As a further example, the drill and driver bits can be of entirely conventional construction. In this case the d—d bit holder becomes a d—d bit "carrier", semi-permanently mounting and retaining a conventional drill or driver bit at its proximal end region. To do so the d—d bit holder/carrier will have at its distal, or driving/drilling, end (i.e., oppositely directed to the rotary power tool) a particular structure suitable to, at times, engage a drill of a driver bit (so as to mount the drill or driver bit). This structure may be, for example, a simple shaft with a hollow bore having a side set screw. Either a replaceable driver bit, or, even more commonly, a drill bit subject to wear, is locked by the set screw into to the bore.

Likewise, mere variation in the contours of the d—d bit holder and the complimentary cavities of the d—d bit dispenser are not outside the purview of the present invention which, once understood, will be seen to permit of many variations.

These variations mean that the system of the present invention can be sold into the market both 1) "tightly integrated" to work only with specially adapted rotary power tools and/or d—d bits of the seller, or 2) "loosely integrated" so as to use totally conventional (i) rotary power tools (commonly handheld electric drills) and/or (ii) drills, and driver bits. In the later case 2) the system is clear retrofittable to existing equipments, drills and bits to permit them to become "quick release, quick attach".

1. A d—d Bit Dispensing System

Therefore in one of its aspects the present invention is embodied in a d—d bit dispensing system for use with (i) a rotary tool and (ii) a plurality of drills/driver bits ["d—d bits"] suitable to engage a workpiece.

The system includes an elongate d—d bit holder (i) releasibly mounting at its distal end region one of the plurality of d—d bits, and (ii) mounting at its proximal end region to the rotary tool.

The system further includes a d—d bit dispenser having and defining within its body a number of substantially cylindrical substantially co-parallel elongate cavities each with a partially relieved side regions of complex contour defining a side entrance and extraction channel, each cavity holding at its bottom an associated one of the plurality of d—d bits.

By this structure a d—d bit mounted at the distal end region of the d—d bit holder that is itself mounted at its proximal end region to the rotary tool (1) is first slid downward into an empty cavity of the d—d bit dispenser until, (2) being pushed full downwards to the bottom of the cavity, the (3) d—d bit is released, at which time the (3) d—d bit holder is next pulled full upwards and out of the d—d bit dispenser, leaving the released d—d bit within the cavity. The d—d bit is by these steps thus released from the d—d bit holder into an associated cavity of the d—d bit dispenser.

Alternatively, and oppositely, when the d—d bit holder mounted at its proximal end region to the rotary tool mounts no (null) d—d bit at its distal end region then it may be (1) first entered downward into a cavity of the d—d bit dispenser in which cavity is already present a d—d bit, until (2) pushing the d—d bit holder full downwards in the cavity, a sleeve moves on a collar of the d—d bit holder (and thus upon the d—d bit holder itself), permitting a d—d bit that is within the bottom of the cavity to be received at the distal end region of the d—d bit holder. The d—d bit holder is (3) then slid laterally sideways out of the cavity through the side entrance and extraction channel (as defined by the partially relieved side region of the cavity) with the d—d bit attached to the d—d bit holder. The d—d bit is thus picked up from a selected cavity of the d—d bit dispenser, and is received into the d—d bit holder for use with the rotary tool.

In greater detail, the preferred d—d bit holder has (i) a distal end region receiving a d—d bit suitable to engage a workpiece, only one of the plurality of drills/driver bits being so received at any one time, (ii) a sliding sleeve on a collar at a distal end region, this sleeve sliding between a first position retaining a received d—d bit and a second position releasing the d—d bit, (iii) a spring-loaded catch for holding the sliding sleeve in a position retaining the d—d bit in the d—d bit holder, and (iv) a proximal end region suitably mounted within or to the rotary tool, normally to a chuck of the tool.

The preferred d—d bit dispenser has and defines within its body a plurality of substantially cylindrical substantially co-parallel elongate cavities, disposed substantially vertically in operation, with partially relieved side regions of complex contour defining as a side entrance and extraction channel. Each cavity holds at its bottom an associated one of the plurality of drills/driver bits at such times as the associated d—d bit is not received by, and mounted to, the distal end region of the d—d bit holder.

With these preferred structures a d—d bit—received by the distal end region of the d—d bit holder that is itself mounted at its proximal end region to a chuck of a rotary tool—(1) is first slid downward into an empty cavity of the d—d bit dispenser, this downward motion being so that (1) the d—d bit is pushed downwards until its sleeve slides upon its collar, (2) releasing the d—d bit, and (3) permitting the d—d bit holder to be pulled fully upwards and out of the d—d bit dispenser, (4) leaving the released d—d bit within the cavity. The d—d bit is thus released from the d—d bit holder into an associated cavity of the d—d bit dispenser.

Alternatively with these preferred structures, the d—d bit holder, itself mounted at its proximal end region to a chuck of a rotary drill and having no d—d bit received at its distal end region (1) is first slid downward into a cavity of the d—d bit dispenser in which is already present a d—d bit, until (2) the d—d bit that is within the cavity being received at the distal end region of the d—d bit holder, (3) the d—d bit holder is next slid sideways out the side entrance and extraction channel with the d—d bit firmly attached. The d—d bit is thus picked up from a selected cavity of the d—d bit dispenser, and is received into the d—d bit holder for use with the rotary tool.

2. A Method of Releasing a Drill or Driver Bit ["d—d Bit"]

In another of its aspects, the present invention is embodied in a method of releasing a drill or driver bit ["d—d bit"] mounted at the distal end region of the d—d bit holder that is itself mounted at its proximal end region to a chuck of a rotary drill The method consists of first sliding both d—d bit holder and its mounted d—d bit together downward into a generally vertical empty cavity of the d—d bit dispenser. This cavity is relieved at one side so as to define a side entrance and extraction channel—although the relieved region has to this point not been involved in any operation.

Both the d—d bit holder and the mounted d—d bit are then pushed bit full downwards, permitting coaction of interior contours of the empty cavity and the d—d bit holder to release the d—d bit into the bottom of the cavity.

The d—d bit holder is then pulled full upwards and extracted from the d—d bit dispenser, leaving the released d—d bit within the cavity.

This method is, in accordance with the present invention, expanded and extended to mounting a new d—d bit to the now empty d—d bit holder that is still mounted at its proximal end region to the chuck of the rotary tool.

The extended method further includes again sliding the d—d bit holder downward into a selected cavity of the d—d bit dispenser in which is already present a d—d bit. This sliding is again until the d—d bit holder is pushed full downward in the cavity, realizing the same coaction between the interior contours of the cavity of the d—d bit dispenser and the d—d bit holder as transpired before.

However, the d—d bit holder, with d—d bit in contact, is then slid laterally sideways out the side entrance and extraction channel. By this action—as opposed to pulling the b-b bit dispenser full upwards—the d—d bit that is at the bottom of the cavity is engaged.

In this extension of the method the a d—d bit is thus picked up from a selected cavity of the d—d bit dispenser by, and to, he d—d bit holder, becoming (temporarily) mounted to the d—d bit holder for use with the rotary drill.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 1*a* is a diagrammatic perspective view, and FIG. 1*b* is an x-ray side plan view, showing a preferred drill and driver bit ["d—d bit"] holder part of the d—d bit dispensing system of the present invention with its exterior collar up.

FIG. 2*a* is a diagrammatic perspective view, and FIG. 2*b* is an x-ray side plan view, showing the preferred drill and driver bit ["d—d bit"] holder part of the d—d bit dispensing system of the present invention previously seen in FIG. 1 now with its exterior collar down.

FIG. 3 is a an x-ray side plan view showing the preferred drill and driver bit ["d—d bit"] holder part of the d—d bit dispensing system of the present invention previously seen in FIGS. 1 and 2 now with a conventional driver bit attached.

FIG. 10 is a cross-sectional view showing the contours of a side plate to the cavities of the preferred d—d bit dispenser previously seen in FIGS. 4–9.

FIG. 11 is a cross-sectional view showing the contours of a rubber side plate to the cavities of the preferred d—d bit dispenser previously seen in FIGS. 4–10.

FIG. 12, consisting of FIGS. 12*a* through 12*b*, are detail views of the a cylindrical chamber with a "cut-out" on its interior surface wall of the preferred d—d bit holder previously seen in FIGS. 1–3.

DESCRIPTION OF THE PREFERRED EMBODIMENT

Figure 4:
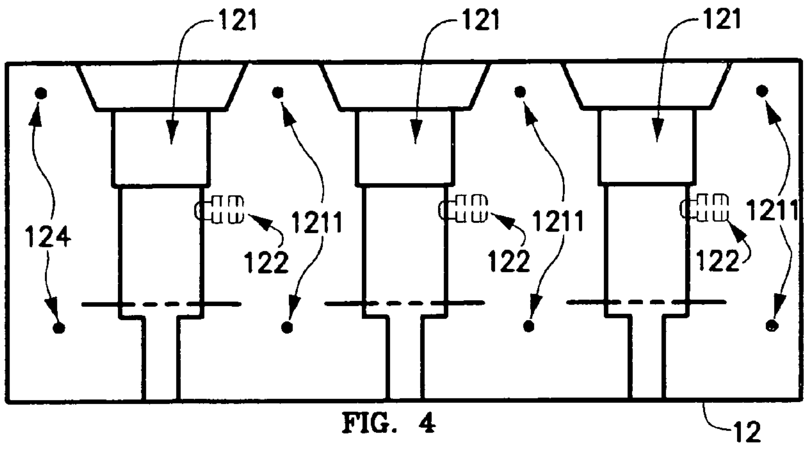
FIG. 4 is a front side plan view.

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

Making reference to FIGS. 1–3, the drill bit holder 11 releasibly holds a drill or driver bit ["d—d bit"] 2, most preferably a d—d bit of a particular form to be explained. The drill bit holder 11 has a distal end shaft 111, preferably hexagonal in cross-section as illustrated, that is semi-permanently engaged within the chuck 31 of a power drill 3 (not shown in FIG. 1, shown in FIGS. 14–16) by action of a conventional tightening of the chuck 3 onto the shaft 111, the shaft 111 and entire d—d bit holder 11 undergoing powered rotation by the drill 3. A distal end region of the drill bit holder 11 has a collar 112 (i) defining a generally cylindrical interior chamber 1121 into which may be received a d—d bit 2, with the chamber 1121 of the collar 112 of the drill bit holder 11 having between its midpoint and distal end at least one ball bearing 113 or equivalent sliding element. This ball bearing 113 slides radially inward and outward with respect to a side wall of the chamber 1121 in respect of the longitudinal up-down (in the orientation of FIGS. 1–3) movement of a ribbed cylindrical sleeve 114 about the collar 112 of the drill bit holder 11. The ball bearing 113 moves radially inward in the chamber 1121 to engage the circumferential groove 21 of d—d bit 2 (shown in FIG. 3, also visible in FIGS. 14–16) so as to retain the d—d bit 2, and radially outward in the chamber 1121 to release the same d—d bit 2.

The preferred d—d bit 2 may have a tip of almost any type or nature. For example, drills of all diameters (suitable for the size of the system 1), and driver bits with standard flat blades Phillips, Torx, Reed and Prince and analogous structures are all supported. However, each d—d bit 2 has a straight-top, tapered-bottom, mandrel 22 that is of the same diameter. This mandrel 22 will later be seen to interact with the d—d bit dispenser 12 (shown in FIGS. 4–16) to realize the loading (and unloading) of a d—d bit 2 to (and from) the d—d bit holder 11, and out of (and into) the d—d bit dispenser 12.

The mandrel 22 to the d—d bit 2 is either (i) pre-assembled either at the factory or (ii) affixed by the user, so that the middle of the bottom end of the mandrel, and the shaft, mandrel and bit, are all of the same axis. By this assembly various drills and/or driver bits—such as Phillips head, flat head, Allen head, socket wrench, drill bit, Torx head, Reed and Prince, etc.—can variously be used on and with one mandrel 22. A particular drill or bit may be affixed to a mandrel 22 (such as until it is worn out) by well-known mechanisms such as set screw.

Notably, structures similar to the drill bit holder 11, and operating to hold drill and driver bits 2, already exist in the market circa 2002 sold by Black & Decker, Skill, Sears and like tool manufacturers under terms like "EZ release" and the like as denote the function of these devices. However, these devices do not contemplate such interaction with an external structure—the d—d bit retainer 12 next to be seen—as is realized by the present invention, are intended to be manipulated by the fingers. Moreover, they do not in general interact with a d—d bit 2 having the constant external diameter mandrel 22 which will prove to be important to the operation of the present invention. Finally, the prior art holders do not exhibit the internal tapered bore features as will be shown in conjunction with FIG. 12.

When the ribbed cylindrical sleeve 114 is axially slid on the collar 112 to one longitudinal position upon the drill bit holder 11 than it forces the at least one ball bearing 113 (or other sliding element(s)) radially inward and into contact with at least a (shoulder) portion of an circumferential groove, or channel, 21 within any d—d bit 2 then within the interior chamber 1121 of the collar 112 of the d—d bit holder 11, holding by contact with this groove 21 the d—d bit 2 within the d—d bit holder 11. Conversely, when the ribbed cylindrical sleeve 114 is axially slid to another, more distal, position upon the d—d bit holder 11 then it permits the at least one ball bearing 113 (or other sliding element(s)) to retract radially outward under spring force from the groove (or channel) 21 of the d—d bit 2, making that the ball bearing no longer contacts any portion of the groove 21 of the d—d bit 2, and that the d—d bit 2 may be axially slid out of the chamber 1121 of the d-bit holder 11.

Figure 14:
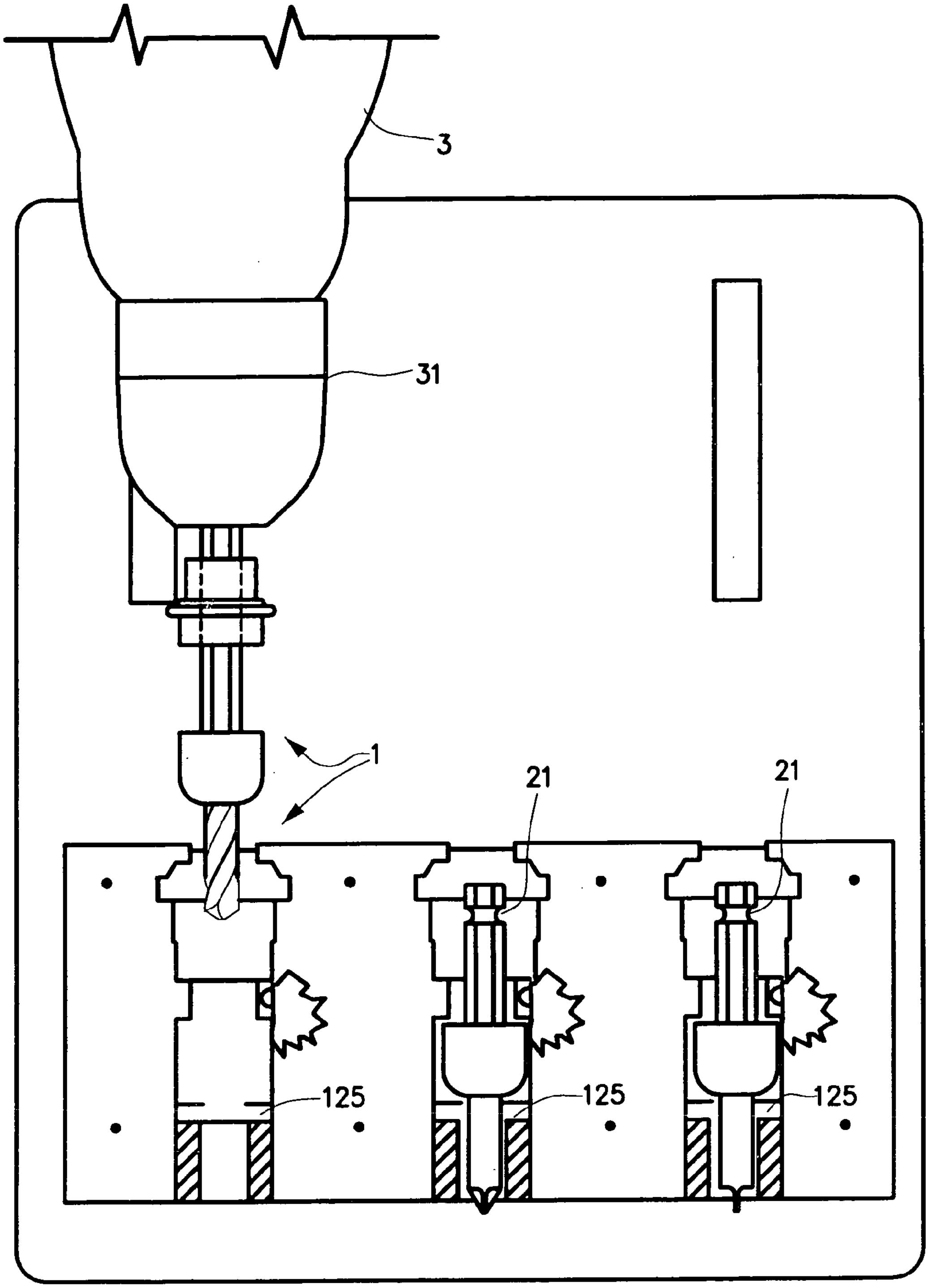
FIGS. 14, 15 and 16 are diagrammatic illustration of the interchange of a d—d bit between the d—d bit holder shown in FIGS. 1–3 and a cavity of the d—d bit dispenser shown in FIGS. 4–13 within the d—d bit dispensing system of the present invention, FIGS. 14 and 15 and 16 in sequence showing three steps in a discharge, or unloading, of a d—d bit from the d—d bit holder to the d—d bit dispenser.
Figure 15:
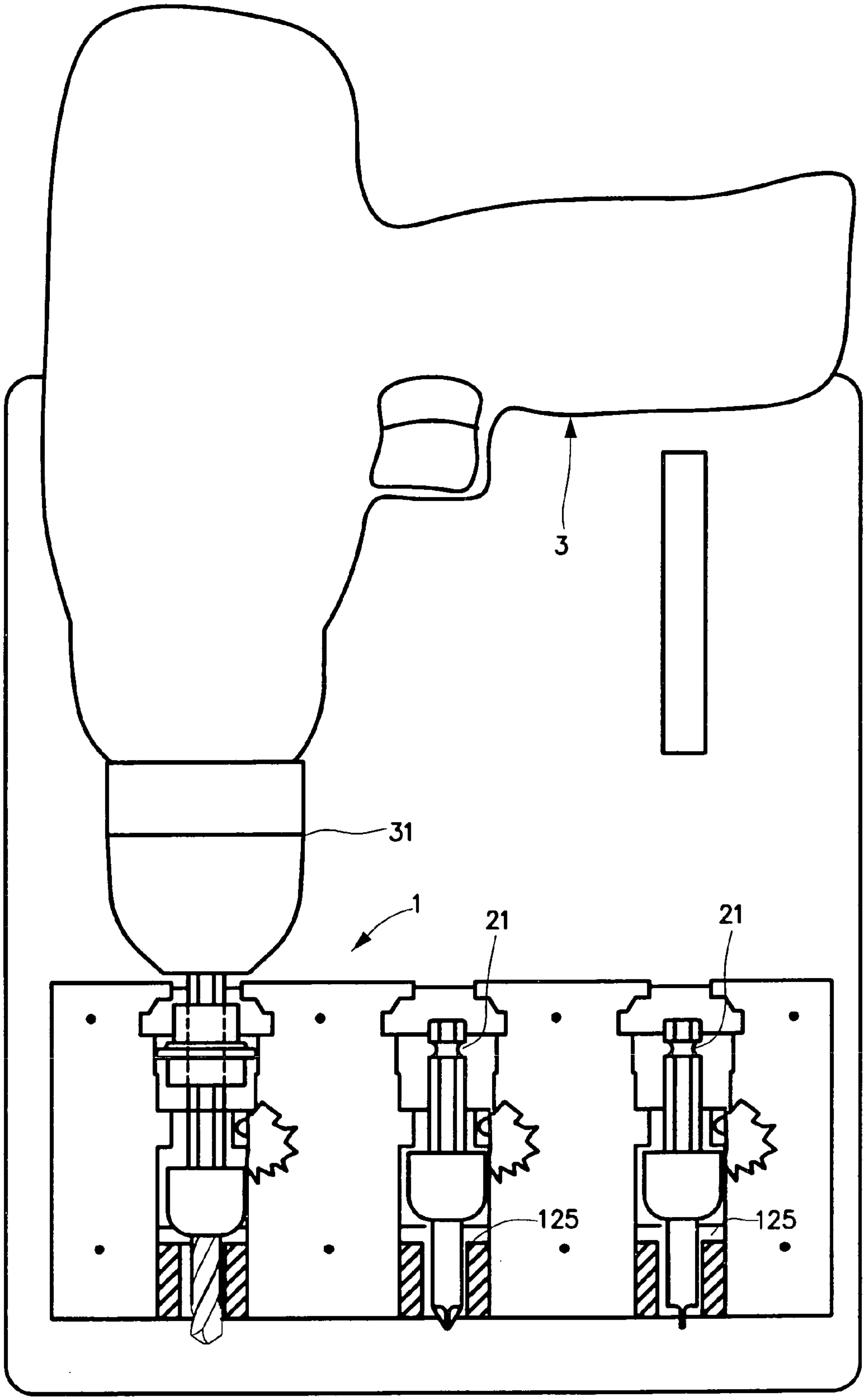
Figure 16:
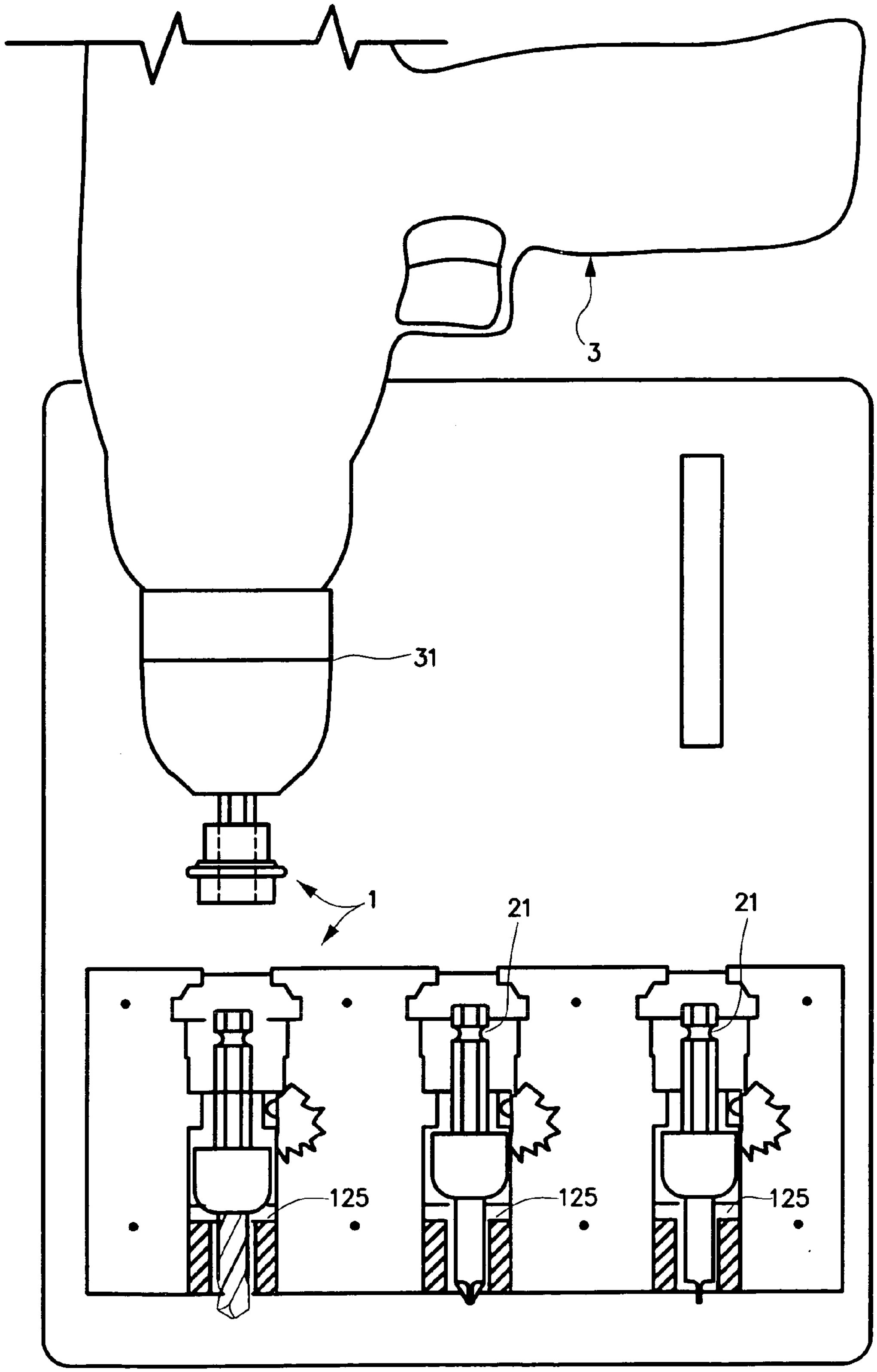

The d—d bit holder 11 thus permits easy removal and installation of a d—d bit 2 by action of (i) a simple longitudinal sliding of the cylindrical sleeve 114 along the cylindrical collar 112 of the d—d bit holder 11. The preferred d—d holder 11 preferably consists of shaft 111 integral with, or permanently attached as by welding, to the cylindrical collar 112 containing the cylindrical chamber 1121 as shown in the drawings. All elements are of the same axial relationship. The shaft 111 is preferably hexagonal in shape, as illustrated, for better grip by the chuck 31 of a power drill 3 (as shown in FIGS. 14-16).

Momentarily referring to FIG. 12, the interior cavity at the base of the d—d bit holder 11 is as illustrated therein. These FIGS. 12*a* through 12*b*, are detail views of the cylindrical chamber of the preferred d—d bit holder 11 having a "cut-out" on its interior surface wall. The chamber is beveled to facilitate such slight rotation as may be necessary to engage the preferably hexagonal upper shaft portion of the d—d bit 2, as shown in FIG. 2. Why there might be some slight rotational mis-alignment between the d—d bit holder 11 and a d—d bit 2 that it serves to mount will become clearer upon further explanation of the invention.

Figure 8:
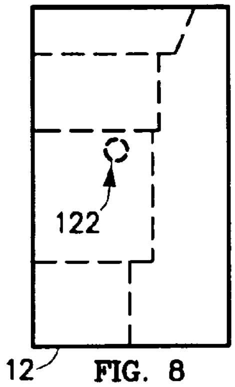
FIG. 8 is a right side plan view.
Figure 5:
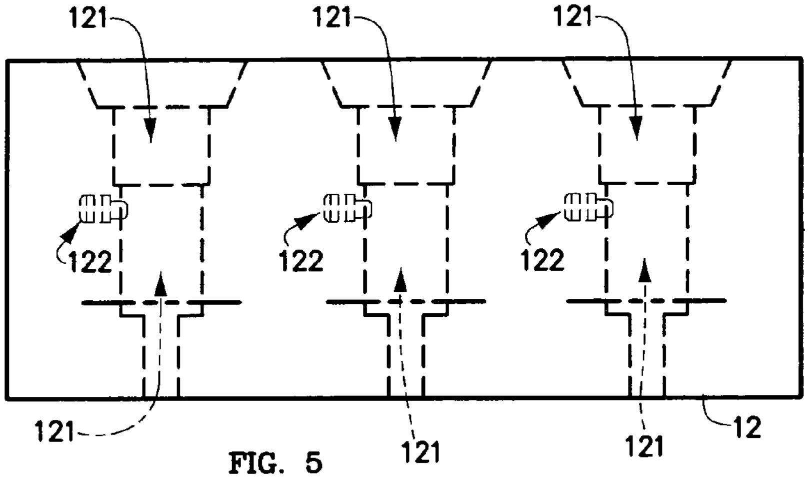
FIG. 5 is a back side plan view.
Figure 9:
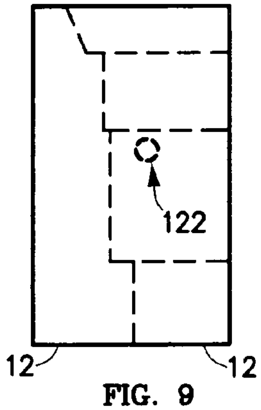
FIG. 9 is a left side plan view of a preferred d—d bit dispenser part of the d—d bit dispensing system of the present invention.
Figure 7:
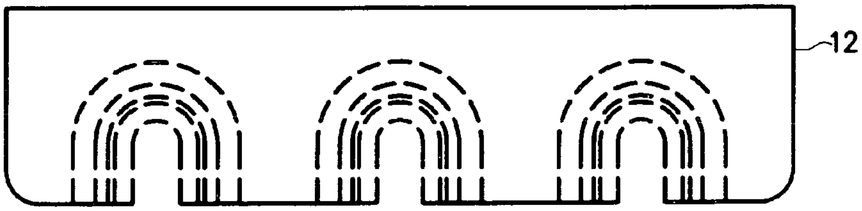
FIG. 7 is a bottom plan view.
Figure 6:
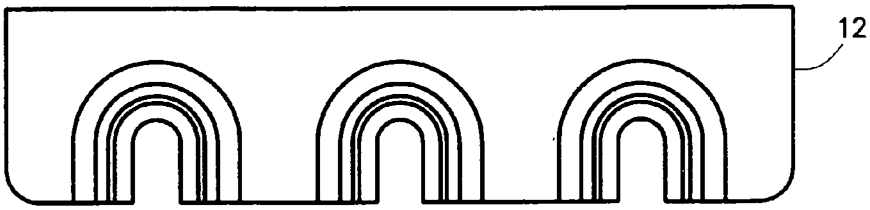
FIG. 6 is a top plan view.

Continuing in the drawings, FIG. 4 is a front side plan view, FIG. 5 is a back side plan view, FIG. 6 is a top plan view, FIG. 7 is a bottom plan view, FIG. 8 is a right side plan view, and FIG. 9 is a left side plan view of a preferred d—d bit dispenser 12 part of the d—d bit dispensing system 1 of the present invention. The preferred d—d bit dispenser 12 has and defines a number of bores 121 each of which is preferably substantially cylindrical in shape (i.e., a cylindrical bore) with relieved side wall to the front of the b—b bit dispenser 12. Each and any d—d bit 2 (shown in FIG. 3) will slide longitudinally into a bore 121 of the d—d bit dispenser until it assumes the same axis as the bore. The interior bores 121 of the d—d bit dispenser 12 have in general complex contours that are interactive with the exterior of the d—d bit holder 11, and also with the d—d bit 2, in the manner next described, which interaction is also supported by the showing of FIGS. 14-16.

Each bore 121 of the d—d bit dispenser 12 is complimentary in size to the d—d bit holder 11 and to the same-diameter mandrel 22 of each and any d—d bit 2. A locking means, and more preferably a ball bearing locking means, 122 is preferably located within each cylindrical bore 121. The locking means 122 serves to catch the square shoulder of the upper surface of the mandrel 2 (best seen in FIG. 14) of the d—d bit 2, thus locking the d—d bit 2 in place and preventing the egress of this d—d bit 2 from inside a bore 121 of the d—d bit dispenser 12.

When a d—d bit 2 is caught, or mounted, within the d—d bit dispenser 12, as shown in FIGS. 15 and 16, then the preferred ball bearing locking means 122 extends from the inside surface wall of bore 121 by nearly half the diameter of the ball bearing of this ball bearing locking means 122. This ball bearing is subject to a limiter preventing it from coming out of its chamber within the ball bearing locking means 122.

There is no "un-locking" of this ball bearing of the ball bearing locking means 122, and of the d—d bit 2 that is serves to retain: once locked by action of the ball bearing locking means 122 within the chamber 121, the d—d bit cannot thereafter rise in the chamber 121. It will later be explained, however, that the d—d bit 2, and also the d—d bit holder 11, can, however, slide sideways out of the chamber 121 through the lower side entrance channel.

During vertical insertion of the d—d bit holder 11 and the d—d bit 2 into a chamber 121 of the d—d bit dispenser 12, the sleeve 114 of the d—d bit holder 11 becomes stopped in the bore 121 while the rest of the d—d bit holder 11, including its collar 112, proceed further downward in the bore 121. Thus the interior contours of the bore 121 serve to activate the catch (via the ball bearing means 113 shown in FIGS. 1 through 3) of the d—d bit 2 within the d—d bit holder 11. The sleeve 114 is preferably spring biased towards the "locking" position (as illustrated drawings FIG. 2*b*), which position is preferably in the "down" direction (in FIGS. 1-3), or farthest from the distal end region of the d—d bit holder 11. The sleeve 114 has two travel limits; an "up" or the "un-lock" and the down or "lock" position. As spring-biased in its down or "lock" position, the sleeve 114 of the d—d bit holder 11 is first inserted vertically into the bore 121 of the d—d bit dispenser 12 from the top.

However when the d—d bit holder 11 is inserted sufficiently far downward into the bore 121 of the d—d bit dispenser 12, the sleeve 114 of the d—d bit holder 11 will commence to touch a shoulder of the bore 121 of the d—d bit dispenser 12, and will catch, precluding any further downward movement. However, the rest of the d—d bit holder 11 and the d—d bit 2 itself will still be move further downward (as pushed by the user) until the point where the d—d bit holder 11 reaches its bottom limit both in relation to (i) the bore 121 of the d—d bit dispenser 12, and (ii) the sliding limit of the sleeve 114 (as illustrated in the drawing).

At this bottom limit of the chamber 121, the sleeve 114 is its "up" or "unlock" position. The d—d bit holder 11 is then pulled vertically upwards out of the bore 121 of the d—d bit dispenser 12 by an upward, or pulling, or lifting, movement by the user. As the bit holder 11 moves upwards, its sleeve 114 also moves upward from its "up" or "unlock" position, gradually returning to its "down" or "lock" position because of spring bias.

The d—d bit dispenser 12 is preferably made of rigid or semi-rigid type material such as metal, rubber or plastic or the like. It has, as illustrated, a number of bores 121 to accommodate and house various drills and driver bits ["d—d bits"] simultaneously, one drill or driver bit being stored in each fore 121.

Each bore 121 consists of upper and lower bore portions. The upper bore portion has a slightly bigger top opening than the diameter of the d—d bit holder 11 and its sleeve 114, thereby allowing this d—d bit holder 11 and its sleeve 114 means to pass longitudinally (up and down) through the bore/channel. The bore 121 also permits the longitudinal passage of the d—d bit. However, the top surface of the lower bore is not big enough to permit longitudinal passage of the sleeve 114 of the d—d bit holder 11. In between the upper and the lower bore portions the mandrel 22 of the d—d bit 2 is caught by the one way catch realized by the ball bearing catch means 122. Longitudinal downward passage (from top to bottom of said bore/channel) of the mandrel 22 and the d—d bit 2 is thus permitted. However, this one way catch (the ball bearing catch means 122) will not permit the upward longitudinal passage once the mandrel 22 one it has passed going downward. This one way catch, or ball bearing catch means 122, is most preferably made as a ball bearing and a spring, clip, hook, latch, bar or the like mechanical catch. The mandrel 22, and/or any other contacted portion(s) of the d—d bit 2 are preferably shaped substantially as shown in the drawings. The beveled, or tapered, bottom edge to the mandrel 22 in particular permits of a one way passage past the catch means, or ball bearing catch means, 122, and an easy catching of the mandrel 22 by these catch means 111.

Two alternative structures, or panels, 123, 124 that fit the front of the d—d bit dispenser 12, and which define and a side entrance channel (including both a "lower side entrance and extraction channel" and an "upper side entrance and extraction channel") to each of the bores 121, are shown in FIGS. 10 and 11. The panel 123 is affixed, normally screws (not shown) fitting in holes 1231 (shown in FIG. 10) and 1211 (shown in FIG. 4), or by welding, or by gluing or other permanent affixation means. Likewise, the 124 is similarly affixed, including by screws (not shown) fitting in holes 1241 (shown in FIG. 10) and 1211 (shown in FIG. 4).

The panel 123 is rigid, and is commonly made of sheet metal or the like. When affixed it defines and presents a side cavity to each bore 121 which cavity is of exacting dimensions. Mainly, the cavity will exactly match the contours the d—d bit holder 11 with a d—d bit 2 attached. The cavity permits a d—d bit holder 11 and d—d bit 2, when properly vertically positioned to slide sideways through the cavity when properly vertically positioned.

The alternative panel 124 is flexible, having mounting holes 1241 and a gate 1242 which is commonly made of sheet rubber, flexible plastic, or the like. When affixed the panel 124 defines and presents a side cavity to each bore 121 which cavity is of dimensions that, while not precisely matching the contours the d—d bit holder 11 with a d—d bit 2 attached, permit such a d—d bit holder 11 and d—d bit 2, when properly vertically positioned, to slide sideways through the cavity and against the retaining force of the gate 1242.

A gate 1242 mechanism on and to the alternative panel 124 may be realized a mechanical spring, elastic plastic, rubber, any combination thereof, and/or like mechanisms. The gate 1242 is preferably of made of metal, rubber or plastic or the like materials or any combination thereof. The retaining force of the gate 1242 helps to prevent that d—d bits 2 held within bores 121 of d—d bit dispenser 12 should undesirably spill out of these bores.

The panels 123, 124 in the front side of the b–d dispenser 12 permit the removal of a loaded d—d bit holder 11 (i.e., with its associated d—d bit 2 mounted) from a bore 121 of the d—d bit dispenser 12 only when this loaded d—d bit holder 11 is in a particular vertical placement position inside the bore 121. Mainly, the loaded d—d bit holder 12 (along with its associated mounted d—d bit) must be opposite the "lower side entrance and extraction channel". (There is no such restriction on an unloaded d—d bit holder 11.)

The "lower side entrance and extraction channel" is located upward in the side of a bore 121 just after the mandrel 22 of the d—d bit 2 has been caught in the bore 121 by the catching means (the ball bearing catching means) 122. This is, or course, where the d—d bit holder 11, and d—d bit 2, are so positioned when plunged full down in the bore 121 by user manipulation of the tool to which they are attached.

Thus the panels 123, 124 control lateral passage, and removal, of the loaded d—d bit holder 11, not permitting this until, and unless, the mandrel 22 is catch buy the catch means 122. The distance and dimensional relationship of the components of the d—d bit holder 11 and the d—d dispenser 12 are thus such that when the sleeve 114 of the d—d bit holder 11 is fully retracted upward into its un-lock position—which happens only when the loaded d—d bit holder 11 once entered into the top of bore 121 of the d—d dispenser is plunged fully downward within this bore 121, and when the mandrel 22 will have already passed downward past the catch means 122—is the loaded bit holder 11 ready to be extracted sideways through the "lower side entrance and extraction channel" of the bore 121.

Each bore 121 of the d—d bit dispenser 12 preferably has as an upper surface to a lowermost shoulder, or shelf, an elastomeric compound, or spring mechanism, 125. Since the bore 121, and its lower shoulder or shelf, are both round, this surface providing an upward force may be realized by, for example, a split leaf washer or spring. The use of this force is to keep any b—b bit 2 retained in the cavity 121 tight against the catch means 122 so that it will not hazard to fall sideways out of the bore 121 (through the relieved side surface of the bore 121, and the gate 123 or 124) when the d—d bit dispenser 12 is tilted.

Thus only a particular placement position of the loaded d—d bit holder 11 permits lateral passage through the side cavity to the bore 121, and the lateral removal of both the d—d bit holder 11 and it mounted d—d bit from the b—b bit dispenser 12. Any position other than full downward will not permit lateral removal of the loaded d—d bit holder 11, through the "lower side entrance and extraction channel" of the bore 121 or anywhere else. Most particularly, a d—d bit 2 cannot be withdrawn out the top the bore 121.

Thus the present invention contemplates a d—d bit dispensing and storage system whereby lateral passages established by silhouette cutout panels on a front side of d—d bit dispenser **1*d* are spring-biased to the closed position, retaining any d—d bit 2 within the dispenser 12, but where any held d—d bit 2 may be engaged with and to a d—d bit holder 11** mounted to a tool by action of a user manipulation of the tool performed with but one hand.

The d—d bit holder may optionally be have a small magnet (not shown) (or equivalent, such as a small friction device such as yet another ball bearing) at the top of its cavity where mounts a ferrous, or magnetically attractable, d—d bit 2. This magnet may come into play, especially for very heavy d—d bits 2, during the short moment during sideways extraction of a loaded d—d bit holder 11 and its mounted d—d bit 2 from a bore 121. The sleeve 114 of the d—d bit holder takes a fraction of a second to slide downwards, and re-seat locking in the d—d bit 2, during the extraction operation. The small magnet helps to retain the d—d bit 2 to the d—d bit holder 11 during this short period, preventing that it should fall away.

Figure 13A:
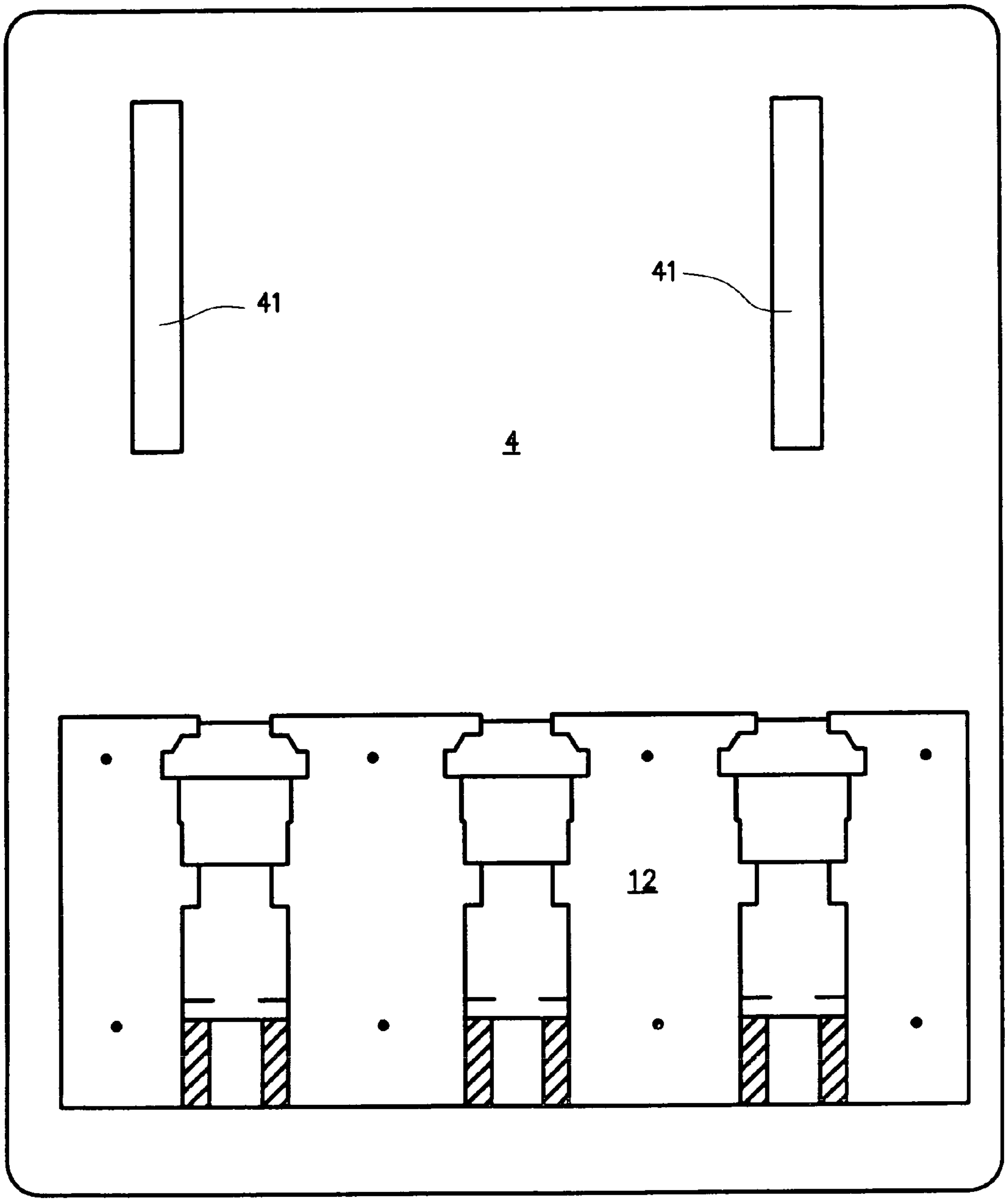
FIG. 13, consisting of FIGS. 13*a*–13*e*, are various plan views illustrating the attachment of the preferred d—d bit dispenser previously seen in FIGS. 4–12 to a belt holster.

A front side plan view illustrating the attachment of the preferred d—d bit dispenser 12 attached to a belt holster 4 is shown in FIG. 13. The holster 4 may particularly be made of leather or plastic. The belt holster 4 to which the d—d bit dispenser 12 is physically attached is most commonly mounted on a belt by apertures 41, thus permitting the user to carry the d—d bit dispenser 12 around a work-site conveniently within hand reach. The user normally uses a cordless power drill 3 having tightened within its chuck 31 with the d—d bit holder 12, thus realizing the quick easy and efficient changing of d—d bits that is the hallmark of the present invention.

A diagrammatic illustration of the interchange of a d—d bit 2 between the d—d bit holder 11 (shown in FIGS. 1–3) and a bore 121 of the d—d bit dispenser 12 (shown in FIGS. 4–13) is shown in sequence in FIGS. 14–16.

In accordance with the preceding explanation, variations and adaptations of the drill and driver bit dispensing system in accordance with the present invention will suggest themselves to a practitioner of the mechanical arts.

In accordance with these and other possible variations and adaptations of the present invention, the scope of the invention should be determined in accordance with the following claims, only, and not solely in accordance with that embodiment within which the invention has been taught.

What is claimed is:

1. A drill and driver bit, or d—d bit, dispensing system for use with (i) a rotary tool and (ii) a plurality of drills and driver bits, or d—d bits, suitable to engage a workpiece, the system comprising:

an elongate d—d bit holder (i) releasibly mounting at its distal end region one of the plurality of d—d bits, and (ii) mounting at its proximal end region to the rotary tool;

a d—d bit dispenser having and defining within its body a plurality of substantially cylindrical substantially co-parallel elongate cavities each with a partially relieved side regions of complex contour defining a side entrance and extraction channel, at least some of the plurality of cavities holding at its bottom an associated one of the plurality of drills/driver bits;

wherein a d—d bit mounted at the distal end region of the d—d bit holder that is itself mounted at its proximal end region to a rotary tool (1) is first slid downward into an empty cavity of the d—d bit dispenser until, (2) being pushed full downwards, (3) the d—d bit is released, at which time (3) the d—d bit holder is then pulled full upwards, leaving the released d—d bit within the cavity;

wherein the d—d bit is released from the d—d bit holder into a selected cavity of the d—d bit dispenser; and where a d—d bit holder affixed at its proximal end region to the rotary tool but mounting no d—d bit at its distal end region (1) is first entered downward into a selected cavity of the d—d bit dispenser in which is already present a d—d bit so that, until (2) being pushed downwards the d—d bit that is within the cavity comes into contact with the d—d bit holder, at which time (3) the d—d bit holder and the d—d bit contacted are both slid laterally sideways out the side entrance and extraction channel of the d—d bit dispenser, (4) leaving the d—d bit mounted to the d—d bit holder for use with the rotary tool.

2. The d—d bit dispensing system according to claim 1 wherein the d—d bit holder comprises:

a distal end region receiving a d—d bit suitable to engage a workpiece, only one of the plurality of d—d bits being so received at any one time;

a sliding sleeve on the distal end region sliding between a first position retaining a received d—d bit in the distal end region and a second position releasing a d—d bit from the distal end region;

a retaining means for holding the sliding sleeve in its first position retaining the d—d bit in the distal end region; and a proximal end region suitably mounted within the chuck of the drill.

3. The d—d bit dispensing system according to claim 2 wherein the distal end region of the d—d bit holder receiving the d—d bit defines a hexagonal cavity into which the d—d bit is received, which hexagonal cavity has bevels on each of its circumferential interior face surfaces, which bevels promote angular alignment of a hexagonal shaft of a d—d bit as received into the hexagonal cavity.

4. The d—d bit dispensing system according to claim 1 wherein the d—d bit dispenser has and defines within its body a plurality of substantially cylindrical substantially co-parallel elongate cavities, disposed substantially vertically in operation, each with a partially relieved side region of complex contour defining a side entrance and extraction channel;

each cavity holding at its bottom an associated one of the plurality of drills/driver bits at such times as the associated d—d bit is not mounted to a distal end region of the d—d bit holder;

wherein a d—d bit, mounted to the distal end region of the d—d bit holder that is itself mounted at its proximal end region to a chuck of a rotary tool, is first entered downward into an empty cavity of the d—d bit dispenser until, by interaction with interior contours of the cavity, the sleeve of the d—d bit holder slides upon the d—d bit holder to its second position releasing the d—d bit, permitting the d—d bit holder to next be pulled fully upwards and away from the d—d bit dispenser, leaving the released d—d bit within the cavity, wherein the d—d bit is released from the d—d bit holder into a selected cavity of the d—d bit dispenser; and wherein the d—d bit holder, itself mounting at its proximal end region to a chuck of a rotary drill but having no d—d bit received at its distal end region is first entered downward into a selected cavity of the d—d bit dispenser in which is already present a d—d bit until, the d—d bit holder being pushed downwards so far that its sleeve will slide to its second position releasing the d—d bit, the d—d bit that is within the selected cavity contacts the distal end region of the d—d bit holder, whereupon the d—d bit holder is next slid laterally sideways out the side entrance and extraction channel with the d—d bit still in contact, whereupon the d—d bit is picked up from a selected cavity of the d—d bit dispenser into the d—d bit holder for use with the rotary drill.

5. The d—d bit dispensing system according to claim 1 for use with a plurality of d—d bits particularly comprising:

a distal end shaft releasibly mountable to the d—d bit holder;

a proximal end drill or driver bit; and a constant diameter mandrel affixing the distal end shaft to the proximal end drill or driver bit.

6. The d—d bit dispensing system according to claim 5 wherein the mandrel of each of the plurality of d—d bits removably so affixes the proximal end drill or driver bit, permitting a drill or driver bit that is worn or damaged to be replaced.

7. The d—d bit dispensing system according to claim 5 wherein the mandrel of each of the plurality of d—d bits has at its proximal end a circumferential bevel, and at its distal end a substantially square shoulder.

8. A method of releasing a d—d bit mounted at the distal end region of the d—d bit holder that is itself mounted at its proximal end region to a chuck of a rotary drill, the method comprising:

first sliding both d—d bit holder and its mounted d—d bit together downward into a generally vertical empty cavity of a d—d bit dispenser, which cavity is relieved at one side to define a side entrance and extraction channel;

pushing both d—d bit holder and its mounted d—d bit full downwards until coaction of interior contours of the empty cavity and the d—d bit holder serves to release the d—d bit into the bottom of the cavity; and then pulling the d—d bit holder full upwards, leaving the released d—d bit within the cavity, until, the d—d bit holder is extracted from the d—d bit dispenser with its former d—d bit no longer attached.

9. The method according to claim 8 expanded and extended to mounting a new d—d bit to the now empty d—d bit holder that is still mounted at its proximal end region to the chuck of the rotary tool, the method comprising:

entering the d—d bit holder downward into a selected cavity of the d—d bit dispenser in which is already present a d—d bit; and continuing pushing full downwards the d—d bit holder into the cavity until coaction between interior contours of the empty cavity and the d—d bit holder causes the d—d bit that is at the bottom of the cavity to become engaged; and then sliding laterally sideways the d—d bit holder with the d—d bit still attached out the side entrance and extraction channel until clear of the d—d bit dispenser;

wherein the d—d bit is picked up from the selected cavity of the d—d bit dispenser into the d—d bit holder, and becomes mounted to the d—d bit holder for use with the rotary drill.

* * * * *